March 26, 1940. A. C. FISCHER 2,194,649
PERFUMED SPONGE RUBBER ARTICLE
Filed Feb. 28, 1935
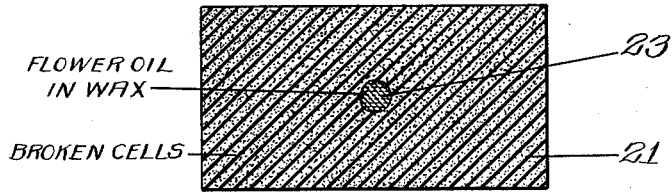
Inventor:-
Albert C. Fischer,
By Knight Bros. Atty.

Patented Mar. 26, 1940

2,194,649

UNITED STATES PATENT OFFICE 2,194,649

PERFUMED SPONGE RUBBER ARTICLE

Albert C. Fischer, Chicago, Ill.

Application February 28, 1935, Serial No. 8,718

9 Claims. (Cl. 299—24)

This invention relates to the manufacture of sponge rubber, preferably having large porous cells contained therein, fabricated out of a fairly good grade of either reclaimed or natural crude rubber. The rubber may be suitably filled and otherwise treated like ordinary sponge rubber.

This invention relates to placing in the interior of this rubber either by allowing an opening by splitting the same and then closing it or by other suitable means, and depositing on the inner layer or in a convenient container comprised of sponge rubber, a few drops of natural flower oil. The cells of the rubber are broken and the odor from the natural flower oil filtrates through the pores of the rubber to the surrounding room, drawer, or receptacle in which the sponge rubber articles repose. I may mix this flower oil with a waxy ingredient, such as beeswax, montan wax, paraffine, bayberry wax, or other suitable wax, or I may use any suitable ingredient which will take up the flower oil readily and deposit same in the shape of little pellets or otherwise in the interior of the sponge rubber, thus confining the oil to a particular pellet. Or I may, as described before, place several drops on the sponge rubber in the interior thereof by splitting the rubber open and then again closing it and suitably sealing it so that the raw flower oil may not penetrate to the surface.

One of the objects of my invention is to allow only a small quantity of the odor of the flower oil to permeate the rubber at a time so that the intensity of the raw oil will not be apparent but the perfume will readily permeate the atmosphere of the receptacle where my article has been laid, and the article itself will take on the odor of the flower oil in a modified form. This eliminates the necessity of using alcohol or other ingredients and the lasting quality and intensity of the flower oil is such that the perfume will last for a long period of time.

This is suitable for a substitute for sachet bags or various articles to repose in dresser drawers or in closets and when used for such purposes either oil or camphor oil or other suitable oil may be used as is used for insecticides and products of this kind. Or it may be used for sponge rubber discs to be used in theatres or toilet rooms or other suitable places where a light permeating perfume is desirable as against an intense penetrating odor. The sponge rubber is prepared in as pure a form as possible but does not necessarily have to be an entirely pure form of rubber. It may be various mixtures of different kinds of rubber or it may be composed of various kinds as long as the sponge rubber functions in its capacity both as to porosity and resiliency.

Several different embodiments of the invention are illustrated in the accompanying drawing showing a sponge rubber article in cross section with an odorizing source at the center thereof.

In Figure 1 a conventional rubber sponge with broken cells is shown at 11. At the center of the sponge is disposed an inner container comprising a sealed sponge with unbroken cells with flower oil therein.

In Figure 2 is shown a sponge similar to 11 but with a central insert 23 comprising a pellet of wax and flower oil.

In Figure 3, 31 is a rubber sponge similar to sponge 11, but instead of having an insert therein it simply has a few drops of flower oil in the center thereof.

My invention lies in breaking the cells of the sponge rubber so that the odor from the raw flower oil or other suitable oil which may be used penetrates a small quantity at a time, thus giving the same effect as if mixed with alcohol and permeating the air through evaporation. Odors of the raw flower oils are so intense as to lose their delicacy and utilizing this method faint delicate perfumes are derived from the raw oils by the gradual evaporation through the sponge cells.

Having thus described my invention what I claim is:

1. A method of perfuming sponge rubber by placing several drops of raw flower oil on the interior of the rubber and sealing the flower oil within rubber so as to fairly imbed the raw oil.

2. A method of perfuming sponge rubber which comprises placing wax pellets containing raw flower oil in the interior of the sponge rubber.

3. A sponge rubber article having concentrated at the interior thereof a perfumed substance much too strong in nature for ordinary exposure and surrounded by a substantial thickness of sponge rubber acting to retard the dissemination of the scent to the surrounding air.

4. A sponge rubber article having flower oil at the interior thereof and means for retarding the dissemination of the odor of said flower oil into said sponge.

5. A sponge rubber article having flower oil at the interior thereof and means for retarding the dissemination of the odor of said flower oil into said sponge, said means comprising a waxy substance with which said flower oil is mixed.

6. A sponge rubber article having flower oil at the interior thereof and means for retarding the dissemination of the odor of said flower oil into said sponge, said means including a rubber container within the sponge rubber article and within which said flower oil is sealed.

7. The combination of a conventional rubber sponge having its cells broken and exposed to the passage of air and water and a small pellet at the interior of said sponge, said pellet including wax and a flower oil.

8. The combination of a conventional rubber sponge having its cells broken and exposed to the passage of air and water and a small pellet at the interior of said sponge, said pellet incuding wax and a flower oil of a percentage with respect to the amount of wax so high as to make the pellet unsuitable for ordinary exposure.

9. The combination of a conventional rubber sponge having its cells broken and exposed to the passage of air and water and a small pellet at the interior of said sponge, said pellet including wax and a flower oil, the percentage of flower oil to wax being at least approximately 10 per cent.

ALBERT C. FISCHER.